Oct. 6, 1936.　　　A. R. THOMPSON　　　2,056,333
FRUIT WASHER
Filed Dec. 12, 1931
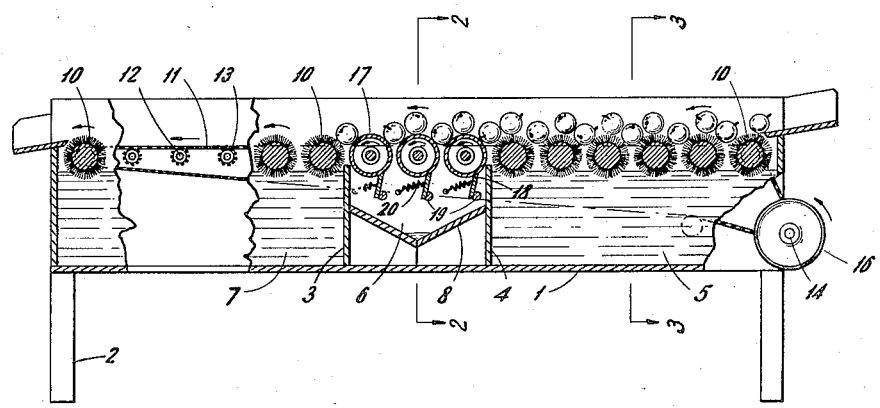
FIG_1.
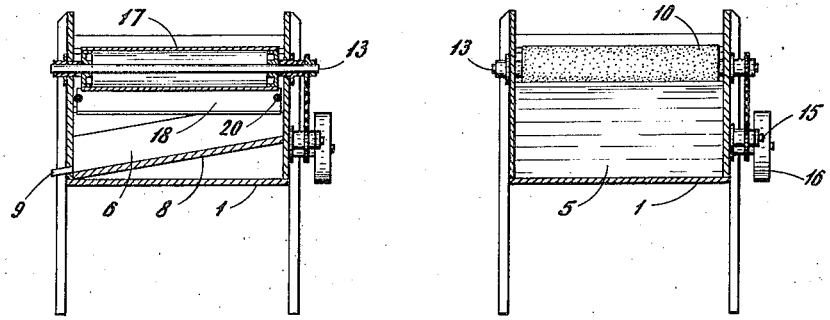
FIG_2.　　　　　FIG_3.
INVENTOR.
A. R. Thompson.
BY Philip A. Minnis
ATTORNEY.

Patented Oct. 6, 1936

2,056,333

UNITED STATES PATENT OFFICE

2,056,333

FRUIT WASHER

Albert R. Thompson, San Jose, Calif., assignor to Food Machinery Corporation, San Jose, Calif., a corporation of Delaware Application December 12, 1931, Serial No. 580,512

2 Claims. (Cl. 146—202)

This invention relates to the art of washing fruit and the like, and contemplates the provision of a novel form of apparatus for the purpose of having separate washing and rinsing sections through which the fruit may be successively passed, and provided with means for preventing contamination of the rinse water by the washing liquid.

To facilitate a proper understanding of the present invention and the manifold advantages thereof it should be remarked that in recent years it has become substantially the universal practice among commercial fruit growers to spray the fruit during its growing period with suitable insecticides or fungicides for the purpose of protecting it against the ever increasing onslaught of insect pests and fungus growths.

The spray materials used for the purpose are not edible, being ordinarily poisonous to humans as well as to insects or fungus, so that before the fruit reaches the ultimate consumer the spray residue must be removed. It is the custom to do this in the packing house, just prior to wrapping and packing the fruit for shipment to market, by passing it through washing machines especially designed for the purpose.

For the reason that most spray residues are not readily soluble in water, such washing apparatus commonly comprises two treating compartments, in the first of which the fruit is subjected to the action of a suitable washing liquid such as a dilute acid, and in the second of which it is rinsed with clear water, the fruit being conveyed successively through the compartments in the order mentioned.

One of the principal problems encountered in the operation of all such machines heretofore has been the difficulty of preventing the conveying apparatus from carrying washing liquid out of the washing section and into the rinsing section, whereby much expensive washing liquid is wasted and the rinse water is contaminated. The quantity of washing liquid thus transferred from the washing section to the rinsing section during the operation of the ordinary washing machine is surprisingly large and, since the washing liquid thus transferred is mixed with the rinse water it is lost beyond recovery and, moreover, makes it necessary to interrupt the operation of the machine at frequent intervals in order to replace the contaminated rinse water with a fresh supply.

It is with the solution of this problem that the present invention is concerned, one of the chief objects being to provide a washing machine having washing and rinsing sections in which novel means is provided for effectively preventing the transfer of washing liquid to the rinsing section, and enabling the recovery of any liquid carried out of the washing section.

Another object is to provide a washing machine of this character in which the conveyor which conveys the fruit through the washing and rinsing sections is provided with a drainage section designed to prevent the carrying over of washing liquid into the rinsing section.

A further object is to provide the conveying elements in the drainage section with means for removing liquid therefrom so as to further insure that no liquid shall be carried over into the rinsing section.

A still further object is to construct the conveying elements in the drainage section of non-absorbent material whereby a portion at least of the washing liquid adhering to the fruit is transferred to the conveyor elements by reason of their greater attraction for liquid than the surface of the fruit, and thus materially reduce the amount of washing liquid that might otherwise be carried over into the rinsing section by the fruit itself.

The foregoing objects and advantages, as well as numerous others not enumerated, will become more apparent as the description proceeds in connection with the accompanying drawing, wherein:

Figure 1 is a longitudinal section of an apparatus embodying the principles of the invention.

Figure 2 is a cross section thereof as viewed along the line 2—2 of Figure 1.

Figure 3 is another cross section viewed along the line 3—3 of Figure 1.

As illustrated, the apparatus comprises a liquid tight tank 1 supported by suitable legs 2 and divided by partitions 3 and 4 into three compartments 5, 6, and 7. The compartment 5 is supplied with a quantity of liquid washing solution which substantially fills it, while compartment 7 is filled with clear rinse water. The intermediate compartment is provided with a sloping V-shaped bottom 8 and a drain spout 9, and this compartment forms a trap for washing liquid carried out of the washing section in a manner presently to be described to prevent its passage from the washing section to the rinsing section, and to enable its recovery for further use.

The fruit to be cleansed is conveyed through the apparatus by a series of cylindrical brushes 10 arranged in closely spaced parallel relation transversely of the path of travel of the fruit and driven in a common direction as indicated by the arrows in Figure 1 by an endless chain 11 engaging with sprockets 12 secured to the outer ends of the brush shafts 13 which project through and are journalled in liquid tight bearings in the side walls of the tank. The chain 11 may be operated by a sprocket 14 secured to a shaft 15 which is rotated by a pulley 16 to which power may be supplied from any suitable source.

The size and spacing of the brushes 10 may be selected as desired so that they support and advance the fruit thereover, but are preferably of such size and so spaced that the pieces of fruit resting in the grooves between the brushes cannot be urged therefrom by the tractive effect of the brushes alone but may be displaced by the weight of additional fruit deposited on the brushes. By such construction the rate of advance of the fruit over the brushes and, consequently, the amount of washing and brushing it receives, may be closely regulated by the rate at which additional fruit is fed thereto.

All of the brushes 10 in both the washing and rinsing sections are so mounted that their lower peripheries dip into the liquid therebeneath so that upon rotation the liquid is applied to the fruit while it undergoes brushing. If the brushes 10 were continuous throughout the apparatus, it will be seen that the usual difficulty of washing liquid being carried over into the rinsing section would be present by reason of each brush throwing liquid upon the next brush ahead. However, this carrying over of the liquid from the washing section to the rinsing section is avoided by providing in the drainage section 6 a plurality of driven rollers or cylinders 17 in lieu of brushes, but which cooperate with the brushes to form a continuous conveyor. The rollers 17 do not throw liquid from one to another as do the brushes but the liquid drips off, falling upon the inclined floor 8 from where it is directed to any desired point of recovery through the drain spout 9. The removal of the liquid from the rollers is also facilitated by squeegees 18 supported by transverse rods 19 and held in contact with the rollers' surfaces by springs 20 so as to remove liquid therefrom.

By the provision of the rollers 17 and the liquid removing squeegees it will be seen that it is practically impossible for any material amount of washing liquid to be carried over into the rinse section by the conveyor, with the result that contamination of the rinse water is avoided.

Some washing liquid may perhaps be carried over into the rinse section while adhering to the fruit, but such quantity is negligible and even it may be materially reduced by constructing the rollers of some non-absorbent material such as, for example, brass, iron, steel or other metal, or glass, rubber, etc. In some instances ordinary wooden or fibre rollers covered over with varnish, lacquer or enamel may be used.

Such non-absorbent surfaces have a greater attraction for liquid than the surfaces of the fruit, which are more or less oily or gummy and tend to repel liquid. Consequently, when a piece of wet fruit is brought into contact with the rollers the moisture adhering to the fruit at the point of contact is transferred to the surface of the rollers. As the pieces of fruit are conveyed over the rollers they are turned about on various axes with the result that the fruit is more or less dried by the time it reaches the brushes in the rinsing section.

Although the invention has been described as being particularly suited for washing fruit, it may also be used to wash other articles of a rollable nature as well, and, as will be understood, various changes and modifications might be made in the apparatus disclosed, all without departing from the spirit or scope of the invention. For example, although washing and rinsing liquids are supplied to the fruit by the partially submerged brushes in the embodiment illustrated, it is contemplated that the liquid may be supplied in other manners, as by means of overhead sprays or streams of liquid directed from above downwardly upon the fruit.

Having now described my invention and in what manner the same may be used, what I claim as new and desire to protect by Letters Patent is:

1. An apparatus for treating fruit comprising two liquid treating sections for wetting the fruit, means in each section for supporting and advancing the fruit, and a source of liquid supply in each section, an intermediate section for supporting and advancing the fruit having smooth non-absorbent surfaces for contacting the surfaces of the fruit and drawing the free moisture therefrom by capillary action, and means for wiping the accumulated free moisture from the surfaces of the contacting means, and means for recovering the same to prevent carrying over of the first liquid to the second, means moving said contacting surfaces to successively contact the wet fruit and then contact the wiping means.

2. An apparatus for treating fruit comprising two liquid treating sections for wetting the fruit, transverse rolls in each section for supporting and advancing the fruit, and a source of liquid supply in each section, an intermediate section for supporting and advancing the fruit comprising rolls having smooth non-absorbent surfaces for contacting the surfaces of the fruit and drawing the free moisture therefrom by capillary action, and wipers rubbing against said rolls for wiping the accumulated free moisture therefrom and means for recovering the removed moisture to prevent carrying over of the first liquid to the second, means for moving said rolls to successively contact the wet fruit and then contact the wiping means.

ALBERT R. THOMPSON.